United States Patent
Wang et al.

(10) Patent No.: US 7,070,329 B2
(45) Date of Patent: Jul. 4, 2006

(54) BUSH AND A BEARING STRUCTURE APPLIED THEREOF

(75) Inventors: Chih-Kuang Wang, Hsinchu (TW); Chih-Hsien Chang, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 96 days.

(21) Appl. No.: 10/739,056

(22) Filed: Dec. 19, 2003

(65) Prior Publication Data

US 2005/0135713 A1    Jun. 23, 2005

(51) Int. Cl.
*F16C 29/02* (2006.01)

(52) U.S. Cl. .......................... 384/42; 384/29
(58) Field of Classification Search .................. 384/7, 384/13, 26, 29–32, 41, 42
See application file for complete search history.

(56) References Cited

U.S. PATENT DOCUMENTS

| | | | | | |
|---|---|---|---|---|---|
| 2,523,393 | A | * | 9/1950 | Rhodes | 384/29 |
| 4,518,205 | A | * | 5/1985 | Heathe | 384/29 |
| 4,566,738 | A | * | 1/1986 | Fasth | 384/29 |
| 4,686,889 | A | * | 8/1987 | Hall | 384/42 |
| 6,179,468 | B1 | * | 1/2001 | Thorstens et al. | 384/40 |

* cited by examiner

*Primary Examiner*—Thomas R. Hannon
(74) *Attorney, Agent, or Firm*—Rosenberg, Klein & Lee

(57) ABSTRACT

A bush and a bearing structure is provided wherein the bush slides along a guiding rod, and the bush is a circular body with an opening to cover the guiding rod over a semicircle. An included angle between the opening and the center of circle of the guiding rod is less than 180 degrees for installing the bush into the bearing structure of a sliding device. The bush is a guiding interface for guiding the sliding device sliding along the guiding rod, and the sliding device can slide along the guiding rod stably.

14 Claims, 14 Drawing Sheets

BUSH AND A BEARING STRUCTURE APPLIED THEREOF

BACKGROUND OF INVENTION

1. Field of the Invention

The invention relates to a bearing structure, and more particularly, to a C-type bush that an included angle between the opening and the center of a circle of the guiding rod is less than 180 degrees.

2. Description of the Prior Art

The optomachinery used for scanning images usually has a bush, and the bush slides along a guiding rod to scan images, so the bush is a main guiding interface for transmission and is a controlling element of precision. FIGS. 1(a)–1(c) are diagrams of three bushes according to prior art. The optomachinery slides along a guiding rod 12 with a bush 10, the bush 10 is usually made with a lubricative material. The bush can be a single-element type as FIG. 1(a) shows, or a multi-element type as FIG. 1(b)(C) show.

In contrast to the bush 10 showed in FIG. 1(b) and FIG. 1(c), the bush 10 in FIG. 1(a) has an advantage of fewer parts, but has disadvantages of larger capacity and accumulative tolerance for integral parts. Thereinafter is explained with FIGS. 2(a) and 2(b). FIG. 2(a) is a diagram shows the conventional single-element bush 10 installed in the optomachinery 14, wherein the distance L between the center of the guiding rod 12 and the housing 16 is:

$$L=a+b+c+d$$

wherein a is the radius of the guiding rod 12;
  b is the thickness of the bush 10;
  c is the thickness of the bearing component 142 of the optomachinery 14;
  d is the distance between the optomachinery 14 and the housing 16.

In which the optomachinery 14 is a movable device, the configuration of distance d is necessary. Since L is composed of four parameters, the accumulative tolerance depends on four tolerances.

FIG. 2(b) shows another bearing structure using the convenient single-element bush. The bearing component 142 of the optomachinery 14 has an opening, and the distance L between the center f the guiding rod 12 and the housing 16 is:

$$L=a+b+c$$

wherein a is the radius of the guiding rod 12;
  b is the thickness of the bush 10;
  c is the distance between the bush 10 and the housing 16.

In which the bush 10 is combined and moved with the optomachinery 14, that is to say the bush 10 and the optomachinery 14 are movable devices, and the configuration of distance c is necessary. In this bearing structure, since L is composed of three parameters, the accumulative tolerance depends on three tolerances, and the size of the optomachinery and the accuracy cannot be improved.

Another conventional bush is developed to overcome the problem of size, as FIGS. 3 and 3(a) show. The bush 10' is U-type designed and contacts the guiding rod 12 in semicircle. The bush 10' cannot be fixed on the guiding rod 12 without a wear-resisting device or a lubrication device 18. The bush 10' must cooperate with the lubrication device 18 holding the housing 16 or the glass so that the optomachinery 14 can stably slide along the guiding rod 12. However, the design of the wear-resisting device or the lubrication device 18 not only occupies more space but also increases assembly and making cost. Furthermore, while actually operating, the contact between the bush 10' and the guiding rod 12 is only in few points, the inner surface of the bush 10' will be damaged after long time using and cannot firmly fix on the guiding rod 12. This will cause the optomachinery 14 wavering while moving.

In addition, the Taiwan patent publication number 465885 "A bush apparatus of scanner" discloses a bush apparatus similar to the single-element type bush in FIG. 1(a). The disclosed characteristic is designing the assembly structure, and cannot solve the problems of size and accumulative tolerance.

The claimed invention provides a bush and a bearing structure applied thereof to fit in with the requirement for small size optmachinery and improve the assembly accuracy.

SUMMARY OF INVENTION

It is therefore a primary objective of the claimed invention to provide a bush and a bearing structure applied thereof to solve the above-mentioned problem. The bush is C-type designed and the included angle between the opening and the center of a circle of the guiding rod is less than 180 degrees. The claimed invention can reduce the size of whole machine and the accumulative tolerance.

It is therefore another objective of the claimed invention to provide a bearing structure with high assembling accuracy.

It is therefore a further objective of the claimed invention to utilize a single bush to fix on the guiding rod, and the bearing structure can stably slide along the guiding rod with the bush. Not only having advantage of few parts, but also improving the problem of damaging the inner surface of the bush.

It is therefore a further objective of the claimed invention to base on the C-type bush design and change the shape of the bush upon the combined way with the optomachinery, and having an advantage of high flexible design of the bearing structure.

According to the claimed invention, a bush is a guiding interface for guiding the bearing structure sliding along the guiding rod. The bush includes a circular body where an opening is designed in to put around the guiding rod and cover the guiding rod over a semicircle, and an included angle between the opening and the center of a circle of the guiding rod is less than 180 degrees for stably sliding the bearing structure along the guiding rod with the bush.

Besides, the bearing structure where the bush of the claimed invention is applied includes a bearing base provided a placement trough, and the bearing base is equipped on the sliding device. Each end of the placement trough is equipped a bush for stably sliding the sliding device along the guiding rod with the two bushes.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a single-element C-type bush having an included angle between the opening and the center of a circle of the guiding rod that is less than 180 degrees. The single-element bush can stably slide the optomachinery and lower the capacity and the accumulated tolerance.

Figure 1C:
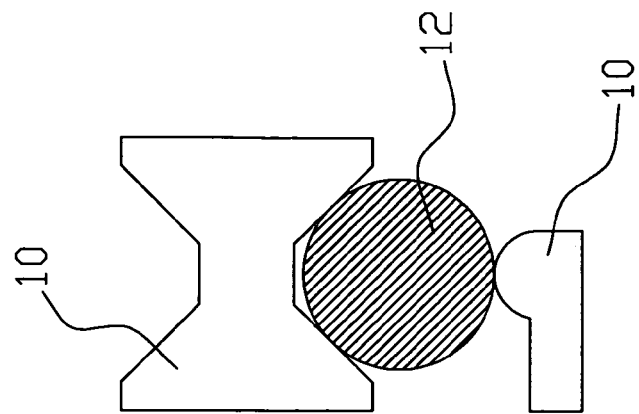
FIGS. 1(a)–1(c) are diagrams of three bushes according to prior art.
Figure 1B:
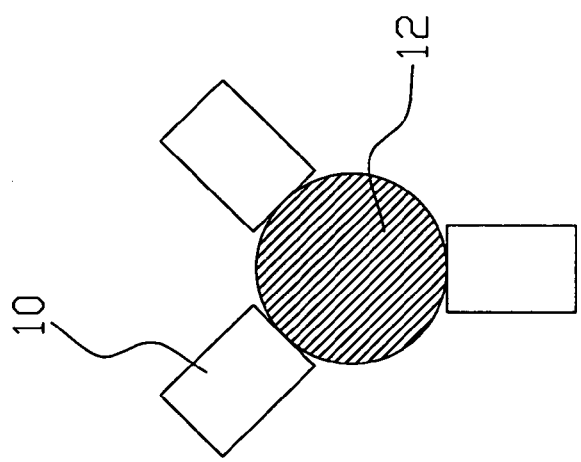
Figure 1A:
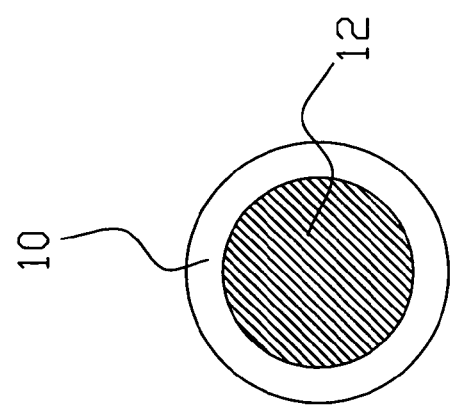
Figure 2B:
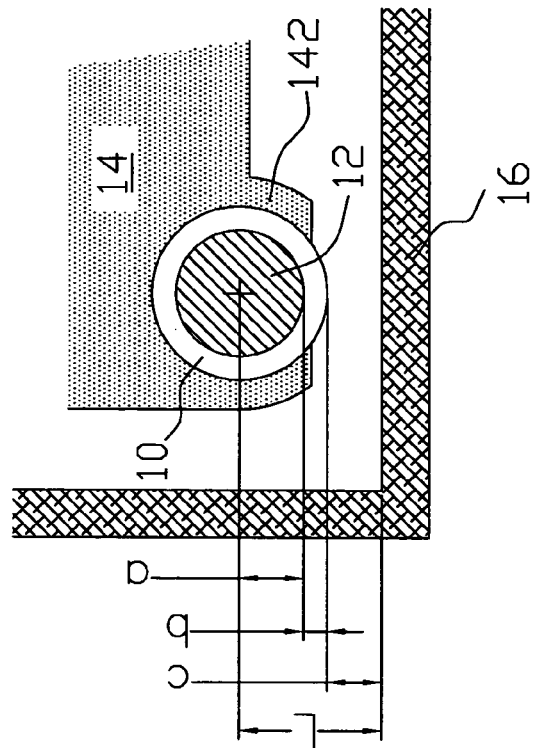
FIGS. 2(a)–2(b) are dimensional diagrams of the components of two bearing structures according to prior art.
Figure 2A:
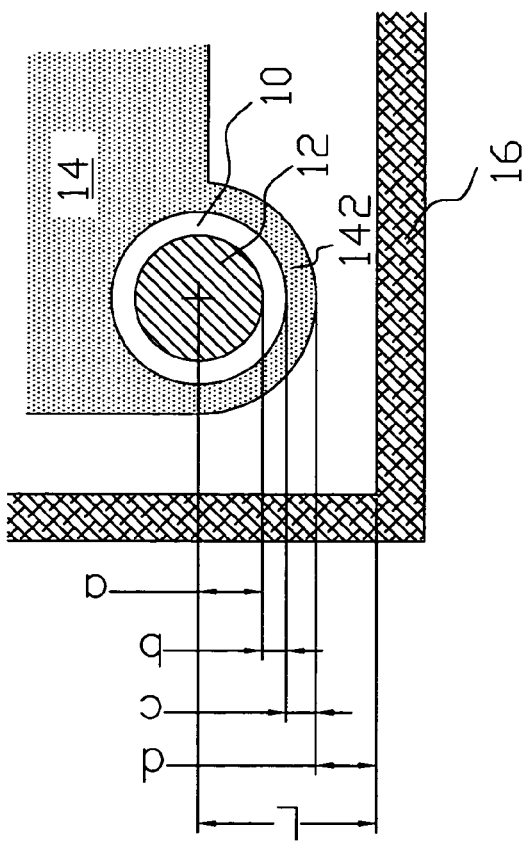
Figures 3, 3A:
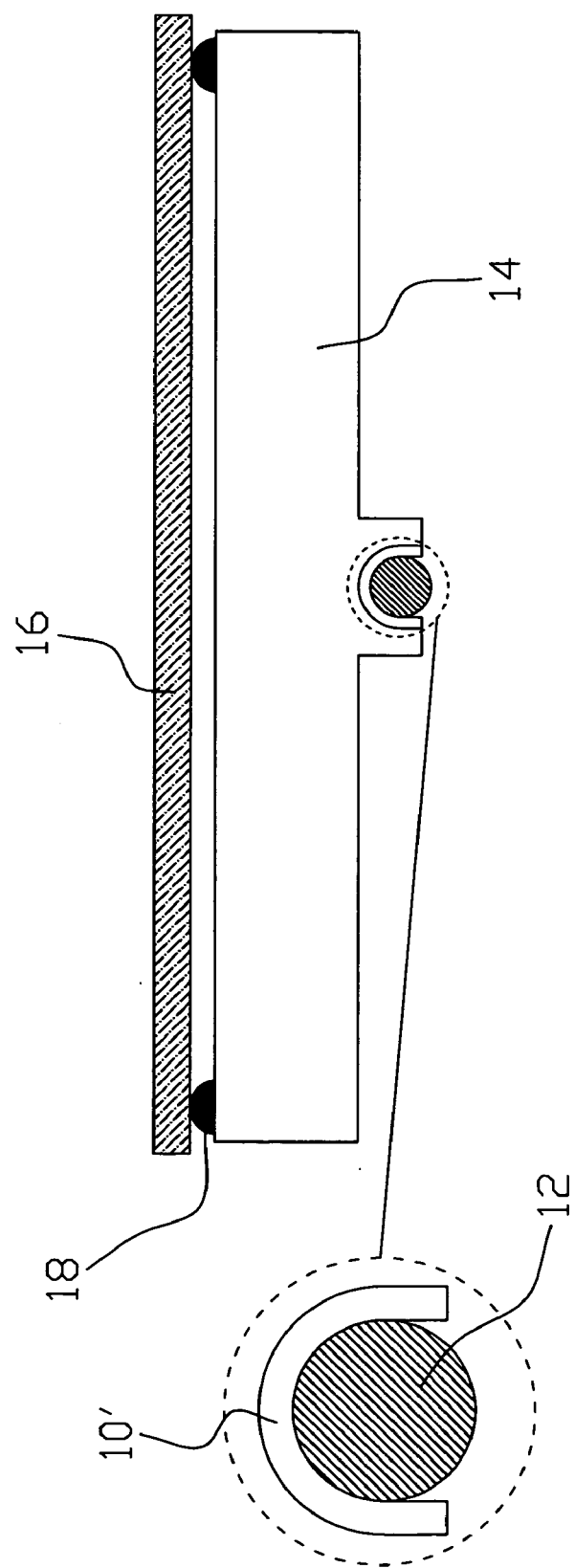
FIG. 3 is a diagram of another conventional bush.
FIG. 3(a) is a diagram magnified in part of FIG. 3.
Figure 4:
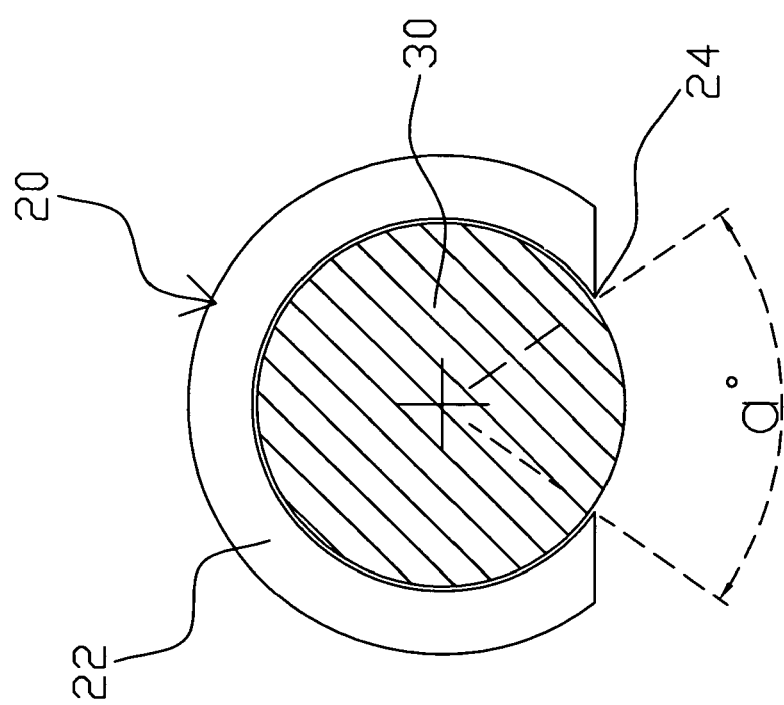
FIG. 4 is a cross-sectional view of a bush of a preferred embodiment according to present invention.

FIG. 4 is a cross-sectional view of a bush of a preferred embodiment according to present invention. The bush 20 has a circular body 22 where an opening 24 is designed as C-type to put around the guiding rod 30 and cover the guiding rod 30 over a semicircle. The included angle "a" between the opening 24 and the center of circle of the guiding rod 30 is less than 180 degrees, and can stably fix the guiding rod 30. The bush 20 is a once-formed single-element device, and its material can be all kinds of materials having lubricity, such as oiled bushes formed by powder metallurgy, plastic bushed, or oilless bushes formed by Polytetrafluoroethylene (PTFE). While installing the bush 20 in a bearing structure to be a guiding interface for guiding the bearing structure sliding along the guiding rod 30, since the included angle "a" between the opening 24 and the center of circle of the guiding rod 30 is less than 180 degrees, the bush 20 can limit and stably fix outside the guiding rod 30. The bearing structure can stably slide along the guiding rod 30 with the bush 20.

The bush 20 is provided in a sliding bearing structure, and the bearing structure can smoothly slide along the guiding rod 30 with the bush 20. The bearing structure is suitable for an optomachinery used for acquiring images, such as scanners, photostats, facsimile machines, all-in-one printers, and so on. Besides, the bearing structure is also suitable for printhead modules of the printing device. The present invention is illustrated with the optomachinery of the scanner to descript the effect of the bush 20 and the combined optomachinery.

Figure 5A:
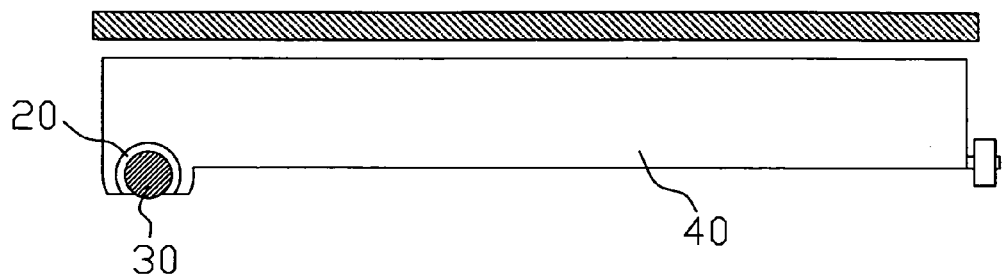
FIGS. 5(a)–5(c) are three locating diagrams of the bush located on the optomachinery according present invention.
Figure 5B:
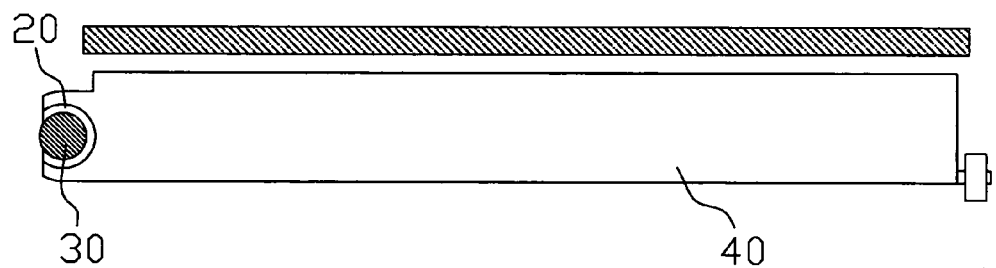
Figure 5C:
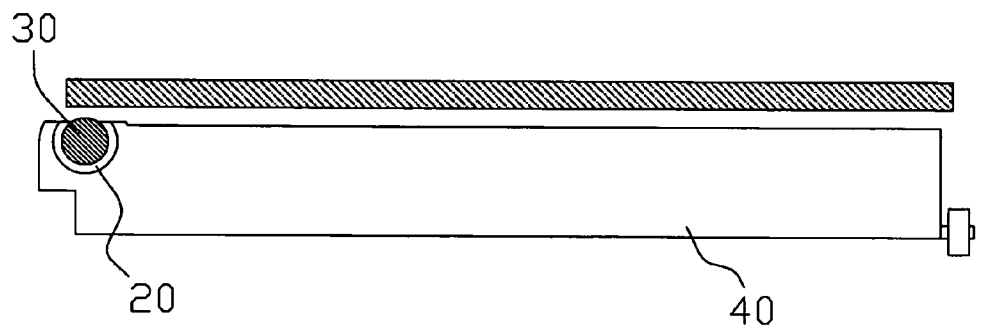
Figure 6A:
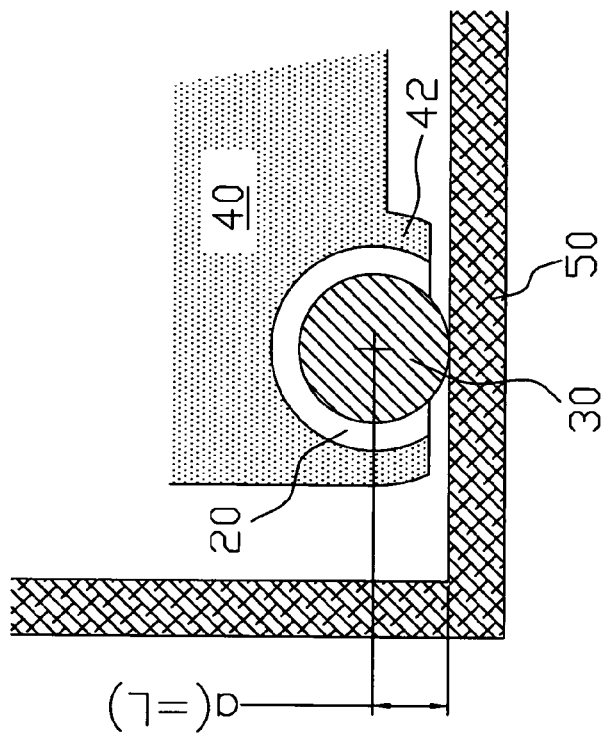
FIGS. 6(a) and 6(b) are dimensional diagrams of two bearing structures according to present invention.
Figure 6B:
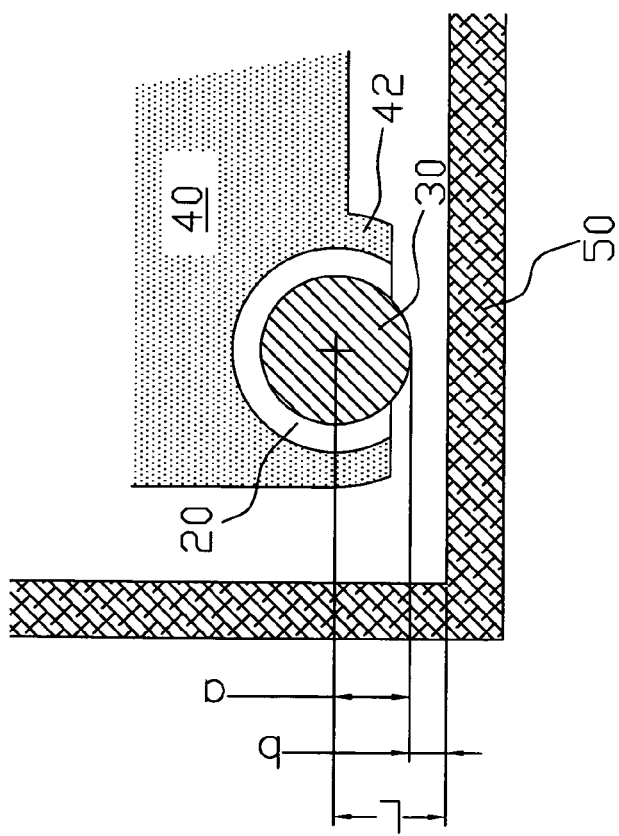

As FIGS. 5(a) and 5(c) show, the bush 20 can be installed in the optomachinery 40 at the above, below or side positions. In contrast to the multi-element bush of prior art, the bush 20 of claimed invention has an advantage of fewer parts; and in contrast to the single-element bush of prior art, the claimed invention can reduce the capacity and the accumulated tolerance and lessen the whole machine, as FIGS. 6(a) and 6(b) show. FIG. 6(a) shows the bush installed in the bearing structure of the optomachinery. In accordance with the bearing base 42 of the optomachinery 40, the distance L between the center of circle of the guiding rod 30 and the housing 50 is:

$$L = a + b$$

wherein a is the radius of the guiding rod 30;
b is the distance between the guiding rod 30 and the housing 50.

Since L is composed of two parameters, the accumulative tolerance only depends on two tolerances.

Furthermore, since the guiding rod 30 is a immovable device, the size "b" in FIG. 6(a) can be 0, as FIG. 6(b) shows. The distance L between the center of circle of the guiding rod 30 and the housing 50 is:

$$L = a$$

wherein a is the radius of the guiding rod 30.

Since L is composed of one parameter, the accumulative tolerance only depends on one tolerance. Thus it can be seen that the claimed invention can reduce the height or the width (the value L) of the housing 50, and can reduce the accumulative tolerance. Certainly, the bush 20 is not limited to locate on the edge of the optomachinery 40 but depends on the design of the optomachinery 40.

Figure 7:
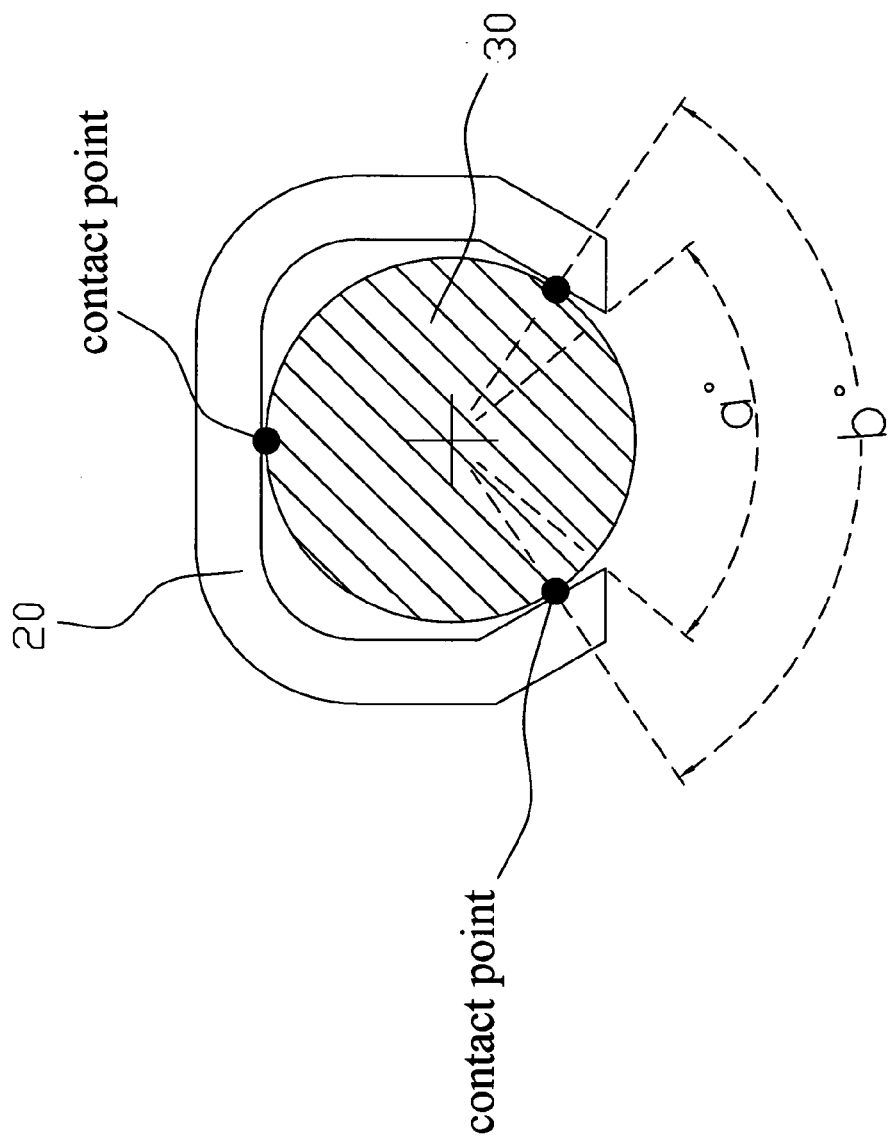
FIG. 7 is a cross-sectional view of a bush of another embodiment according to present invention.

Besides illustrated in FIG. 4, the claimed bush 20 can be also utilized as showed in FIG. 7. FIG. 7 is a cross-sectional view of a bush of another embodiment according to present invention. The bush 20 is an opening type, and the included angle of the opening is "a". When actually operating, the bush 20 contacts the guiding rod 30 at few points, so the bush 20 is designed to contact the guiding rod 30 by multi-point contact type at three or more than three points. The bush 20 covers the guiding rod 30 over a semicircle, and the included angle "b" between the two contact points near to the opening of the bush 20 and the center of circle of the guiding rod 30 is less than 180 degrees. Thus, the bush 20 can be stably fixed outside the guiding rod 30. With this design, even the bush 20 is used a long time and is damaged, the bush 20 can still effectively fix outside the guiding rod 30 and keep the optomachinery 40 stably operated without shake.

Figure 8A:
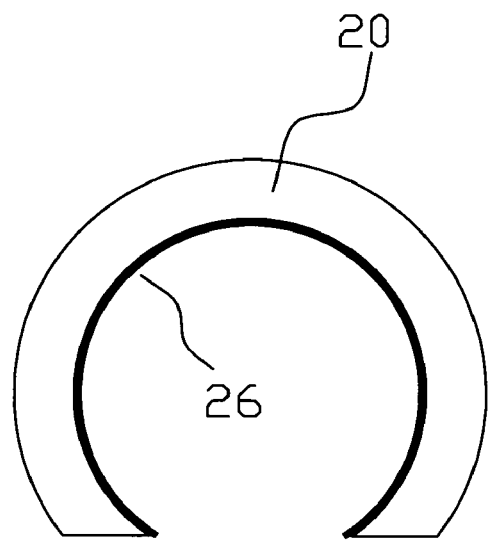
FIGS. 8(a) and 8(b) show other two embodiments of the bush according to present invention.
Figure 8B:
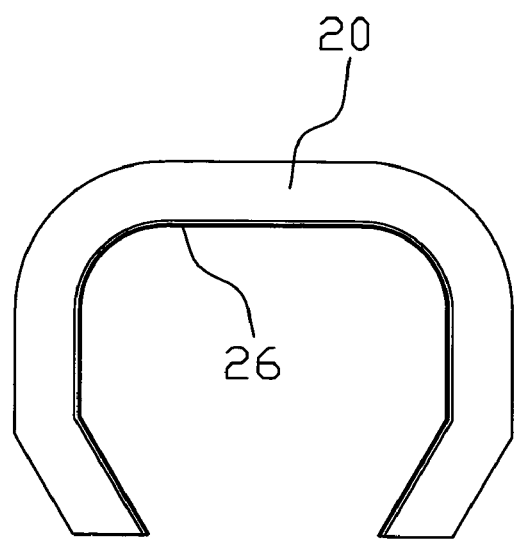

Besides the once-formed type bush 20 in the above-mentioned two embodiments, the bush 20 can also be composed of a circular body 22 and a coating layer or a lubrication flake 26 in inner side, as FIG. 8(a) and 8(b) show. The circular body 22 is a once-formed type with any material, metal or nonmetal including lubrication material mentioned above. The coating layer/lubrication flake 26 combined in inner side of the circular body 22 provides the contact surface between the bush 20 and guiding rod 30 with lubricity and wear-resistibility.

Figure 9A:
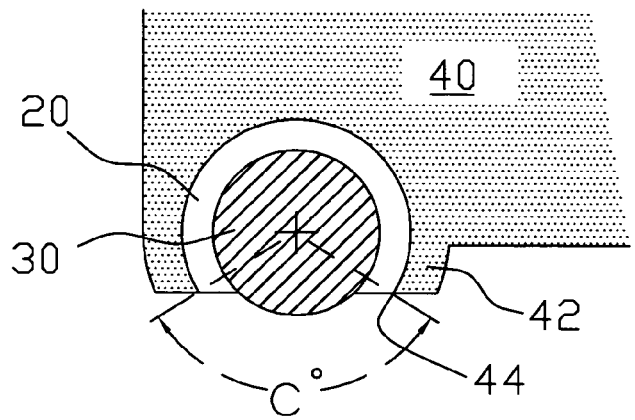
FIGS. 9(a)–9(c) are diagrams of different bearing structures according to present invention.
Figure 9B:
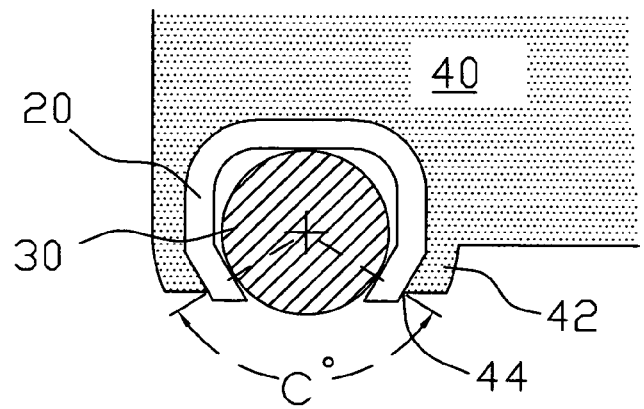
Figure 9C:
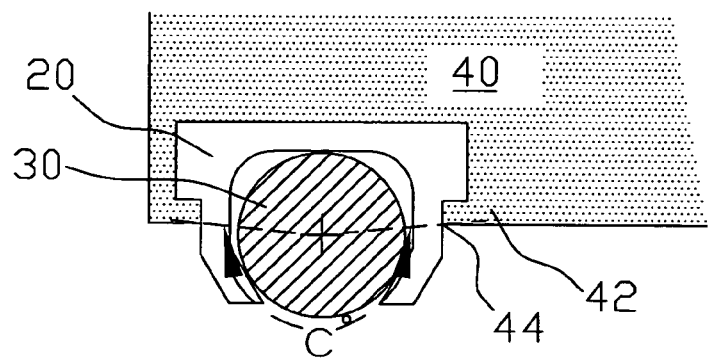

FIGS. 9(a)–9(c) are diagrams of three embodiments of the bearing structures using different bushes according to present invention. The bearing structure of the optomachinery 40 comprises a bearing base 42 provided a placement trough to place the guiding rod 30. Similar to the bush 20, the bearing base 42 has an opening 44. But the bearing base not necessarily cover the guiding rod 30 over a semicircle, in another word, the included angle "c" between the opening 44 of the bearing base 42 and the center of circle of the guiding rod 30 can be at random, only depends on the combination type of the bush 20 and the optomachinery 40.

Figure 10A:
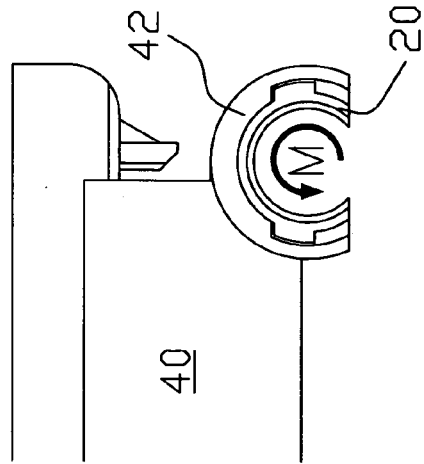
FIGS. 10(a)–10(c) are diagrams showing the limited directions of the bush in the bearing structure according to present invention.
Figure 10B:
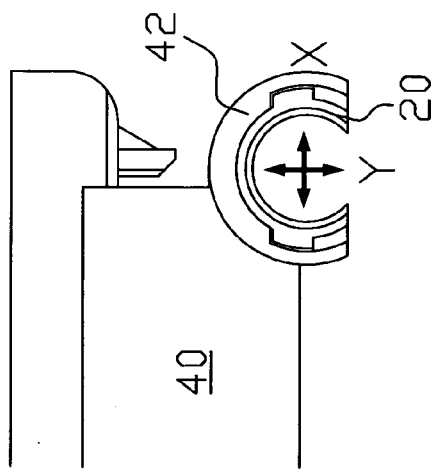
Figure 10C:
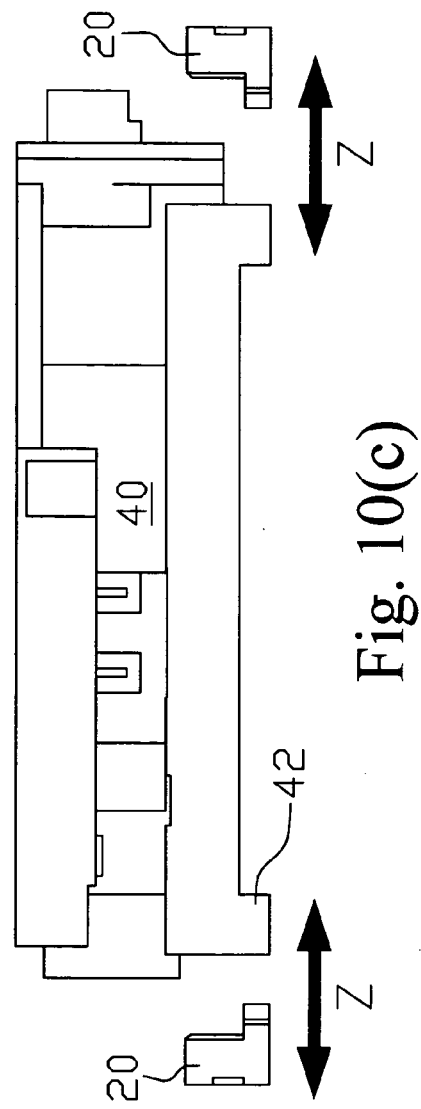

The method for combining or fixing the bush 20 and the optomachinery 40 can be an embedded combination or a flexible combination design, and these two methods are described thereinafter. Please refer to FIGS. 10(a)–10(c), there are three moving events needing control in the combination structure of the bush 20 and the optomachinery 40. The three events are: (1) the directions X, Y perpendicular to the axis of the guiding rod 30; (2) the rotating direction M perpendicular to the axis of the guiding rod 30; (3) the direction Z parallel to the axis of the guiding rod 30.

The design of embedded combination is familiar. As FIGS. 9(a), 9(b) show, the size of combination position of the bush 20 with the optomachinery 40 is larger than the opening 44 of the optomachinery 40, and the bush 20 is pressed into the placement trough of the bearing base 42 of the optomachinery 40 with tools. The bush 20 and the bearing base 42 are firmly fixed, and the directions X, Y, Z, M are all controlled.

Figure 11:
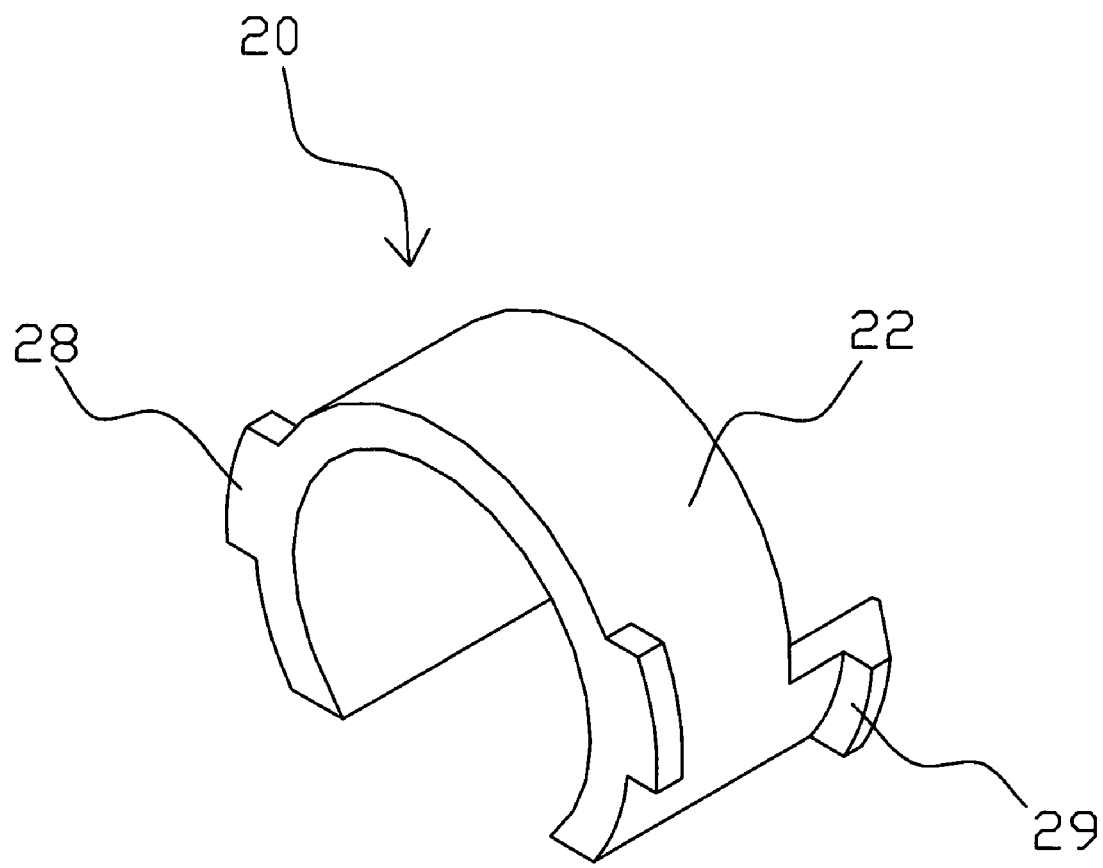
FIG. 11 is the bush of a further embodiment according to present invention.
Figure 12:
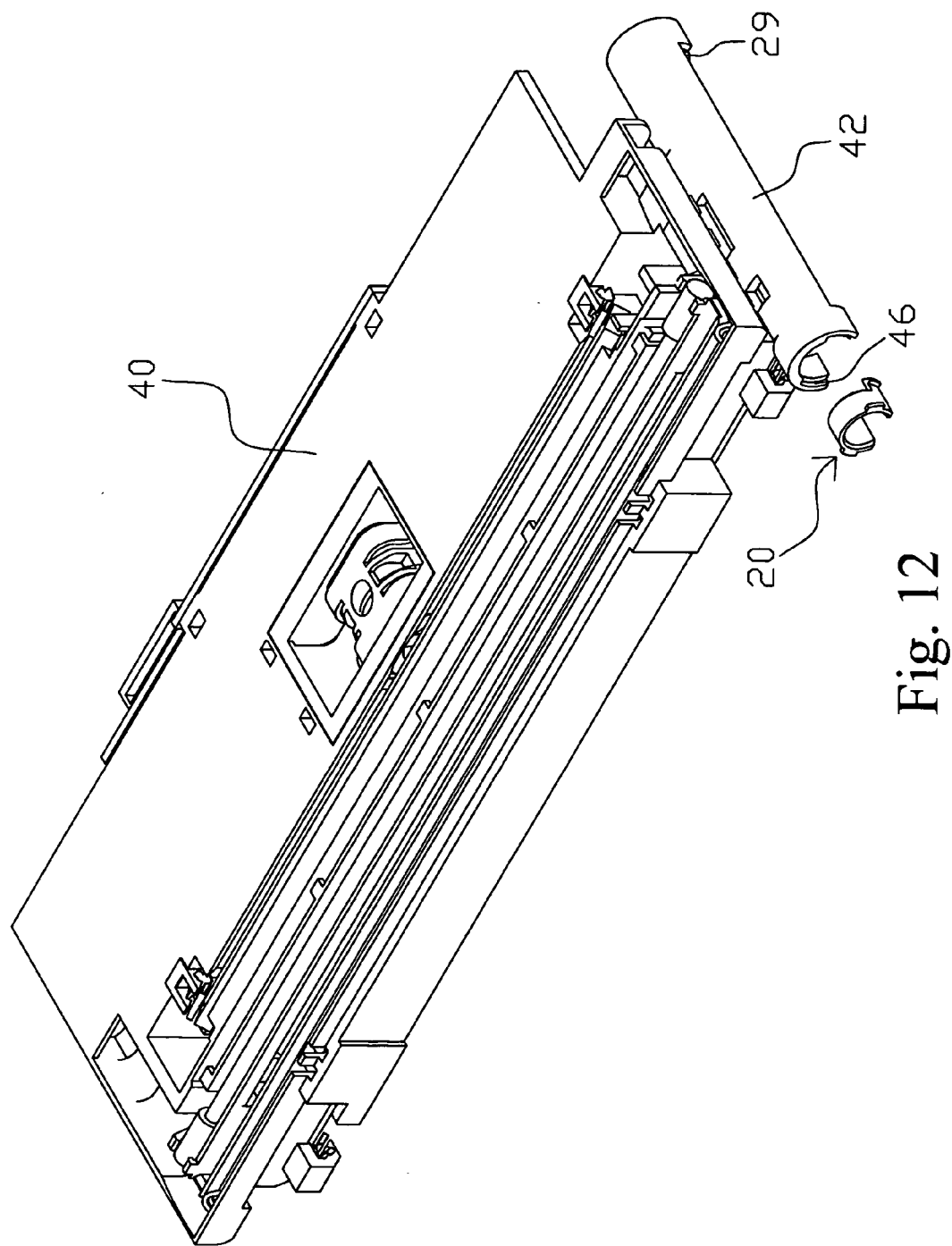
FIG. 12 is an assembling diagram of the bush and the optomachinery according to present invention.
Figure 13:
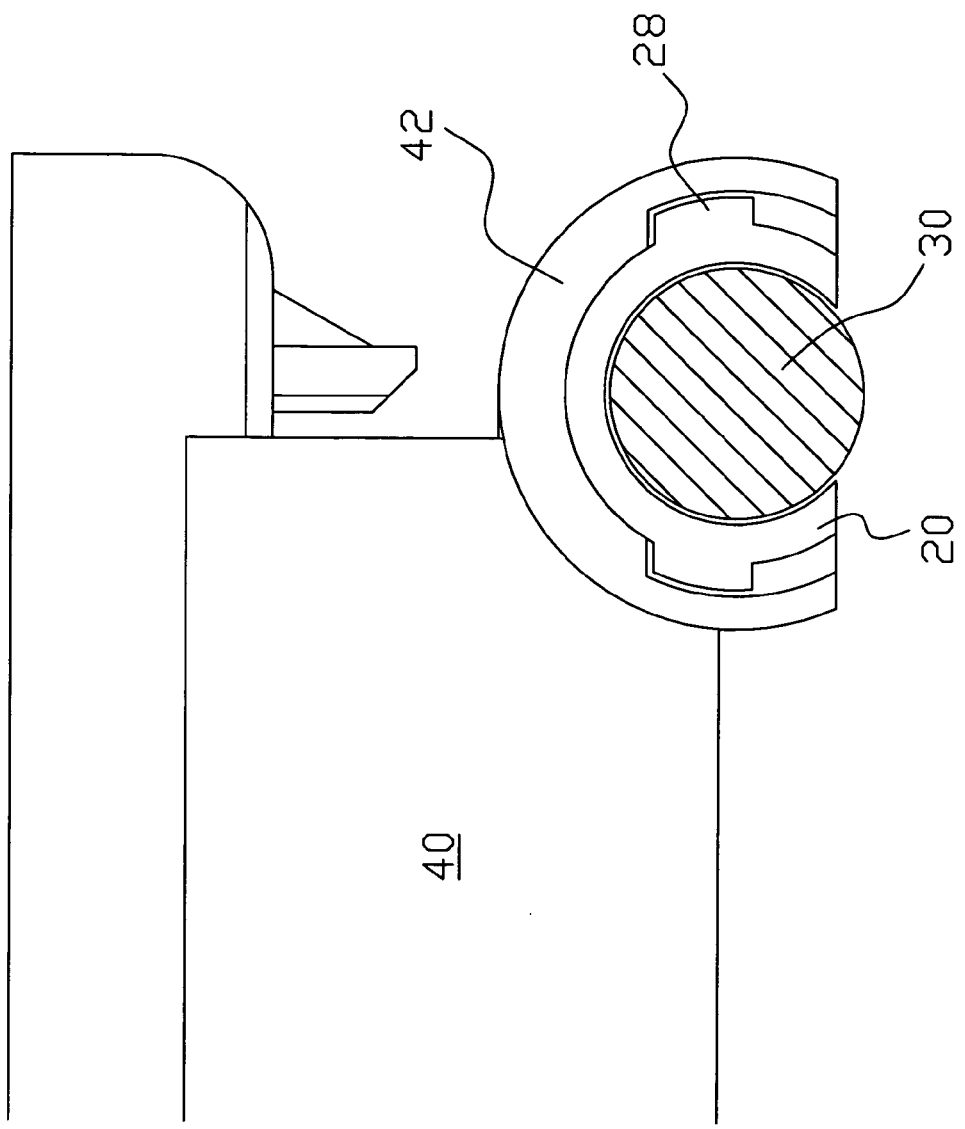
FIG. 13 is a diagram magnified in part of FIG. 12.

As the flexible combination design, the material of the bush 20 can be a once-formed plastic, or a once-formed metal with a lubrication layer. FIG. 11 shows the structure of the bush 20, and is a 3-dimentional diagram of a further embodiment of the bush. FIGS. 11, 12, 13 are collocated to show the combination of the optomachinery and the bush. Two blocks 28 are equipped along a centrifugal direction at a front border of the circular body 22 of the bush 20, and the two blocks 28 are at same vertical position corresponding to two locating troughs 46 of the bearing base 42 of the optomachinery 40. Two hooks 29 are equipped at a rear border of the circular body 22, and the two hooks 29 are at same vertical position. While installing the bush 20 into the bearing base 42, the bush 20 uses the flexible dilated circular body 22 to combine with the inner surface of the bearing base 42 and limit the movement along directions X, Y. The blocks 28 limit the movement of the bush 20 along directions Z and M, and the hooks 29 limit the axial movement along direction Z. With the flexible dilated circular body 22 of the bush 20, the two blocks 28 at the front border and two hooks 29 at the rear border, the bush 20 can be fixed in the bearing base 30.

Figure 14:
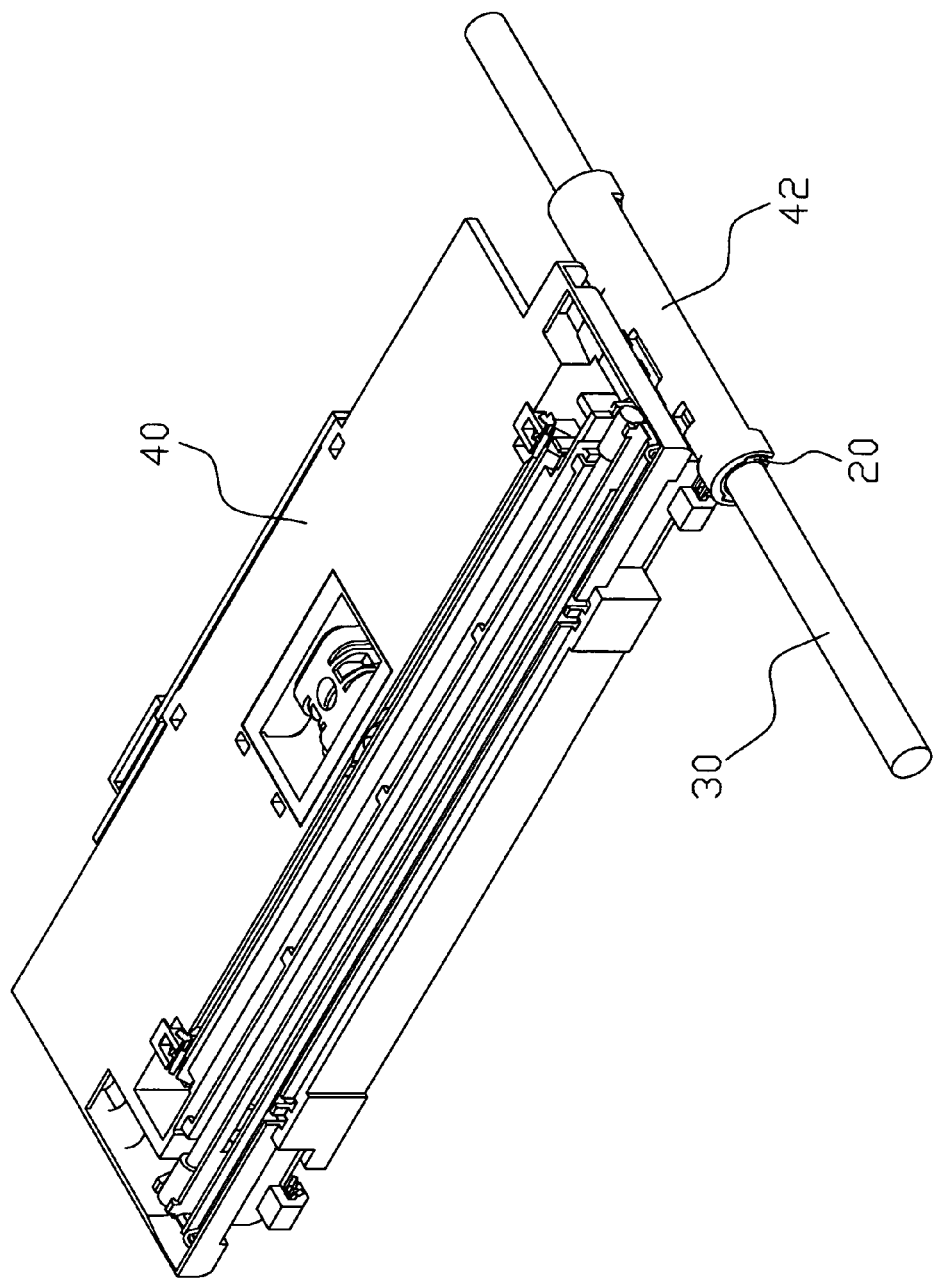
FIG. 14 is a completely assembled diagram of the bush, the optomachinery and the guiding rod according to present invention.

With the above-mentioned combination structure, the two bushes 20 are respectively installed in the placement troughs at two ends of the bearing base 42 of the optomachinery 40 and assemble the optomachinery 40 and the guiding rod 30 together. As FIG. 14 shows, after assembling, the inner surface of the circular body 22 of the bush 20 contacts the guiding rod 30 at more than three points, and the bush 20 keeps the optomachinery 40 stably sliding along the guiding rod 30.

Hence, the present invention uses a C-type bush and makes the included angle between the opening and the center of circle of the guiding rod less than 180 degrees. After being installed into an optomachinery, the bush can be fixed on the guiding rod and makes the optomachinery sliding stably. Cooperating with the design of the opening, the invention can effectively reduce the capacity of whole machine and the accumulative tolerance, and achieves effects of scaling miniaturization, accurate assembly and flexible design.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A bush provided in a bearing structure as a guiding interface for guiding the bearing structure to slide along a guiding rod, the bush comprising a circular body having an opening formed therein to put around the guiding rod and cover the guiding rod over a semicircle, and an included angle between the opening and the center of a circle of the guiding rod is less than 180 degrees for stably sliding the bearing structure along the guiding rod with the bush, the bush having a plurality of blocks equipped along a centrifugal direction at a side border of the circular body of the bush, the blocks limit axial and rotational movements of the bush in the bearing structure.

2. The bush of claim 1 wherein the bush is once-formed, and the bush is made with a lubricative material.

3. The bush of claim 1 wherein the bush is selected from an oiled bush manufactured by a powder metallurgy, a plastic bush, and a oilless bush made by Polytetrafluoroethylene (PTFE).

4. The bush of claim 1 wherein the bush is composed of the circular body and a lubrication layer that is combined at a inner side of the circular body.

5. The bush of claim 1 wherein the bush is composed of the circular body and a wear-resisting layer that is combined at a inner side of the circular body.

6. The bush of claim 1 wherein the bush contacts the guiding rod at more than 3 points.

7. A bush provided in a bearing structure as a guiding interface for guiding the bearing structure to slide along a guiding rod, the bush comprising a circular body having an opening formed therein to put around the guiding rod and cover the guiding rod over a semicircle, and an included angle between the opening and the center of a circle of the guiding rod is less than 180 degrees for stably sliding the bearing structure along the guiding rod with the bush, the bush having two hooks equipped at a side border of the circular body of the bush to limit the axial movement of the bush.

8. A bearing structure provided as a guiding interface applied to a sliding device sliding along a guiding rod, the bearing structure comprising:

a bearing base provided a placement trough, the bearing base is equipped on the sliding device, and makes the sliding device being put around the guiding rod with the bearing base and sliding along the guiding rod; and two bushes, each of the bushes has an opening at a circular body, the two bushes are installed at two ends of the placement trough, and are put around the guiding rod and cover the guiding rod over a semicircle, and an included angle between the opening and the center of a circle of the guiding rod is less than 180 degrees for stably sliding the sliding device along the guiding rod with the two bushes, each bush having a plurality of blocks along a centrifugal direction at a side border of the circular body of the bush, the blocks limit the axial and rotational movements of the bush in the bearing base.

9. The bearing structure of claim 8 wherein the bush is once-formed, and the bush is made with a lubricative material.

10. The bearing structure of claim 8 wherein the bush is composed of the circular body and a lubrication layer that is combined at a inner side of the circular body.

11. The bearing structure of claim 8 wherein the bush is composed of the circular body and a wear-resisting layer that is combined at a inner side of the circular body.

12. The bearing structure of claim 8 wherein each of the bushes contacts the guiding rod at more than 3 points.

13. The bearing structure of claim 8 wherein the placement trough of the bearing base has an opening.

14. A bearing structure provides provided as a guiding interface applied to a sliding device sliding along a guiding rod, the bearing structure comprising:

a bearing base provided a placement trough, the bearing base is equipped on the sliding device, and makes the sliding device being put around the guiding rod with the bearing base and sliding along the guiding rod; and two bushes, each of the bushes has an opening at a circular body, the two bushes are installed at two ends of the placement trough, and are put around the guiding rod and cover the guiding rod over a semicircle, and an included angle between the opening and the center of a circle of the guiding rod is less than 180 degrees for stably sliding the sliding device along the guiding rod with the two bushes, each bush having two hooks at a side border of the circular body of the bush to limit the axial movement of the bush.

\* \* \* \* \*